April 9, 1940.  F. P. HEALY  2,196,827
TOOL GUIDE FOR BORING MACHINES
Filed Nov. 5, 1937  2 Sheets-Sheet 1
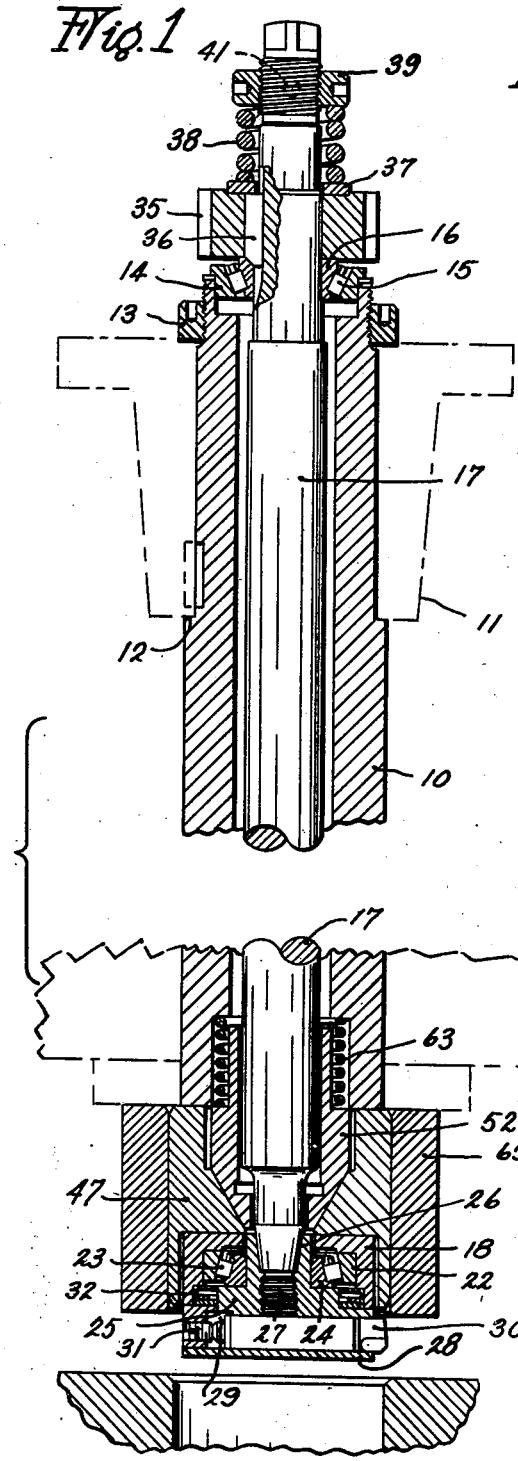
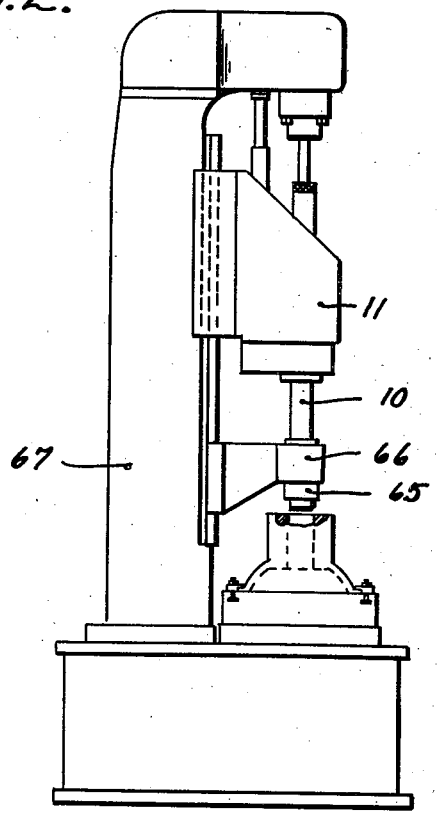
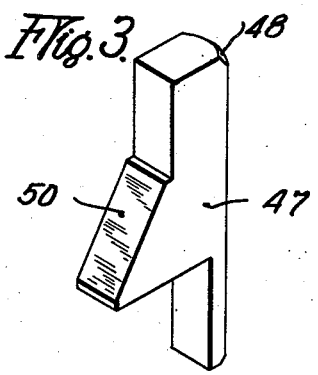
INVENTOR
FRANCIS P. HEALY
BY Chapin & Neal
ATTORNEYS

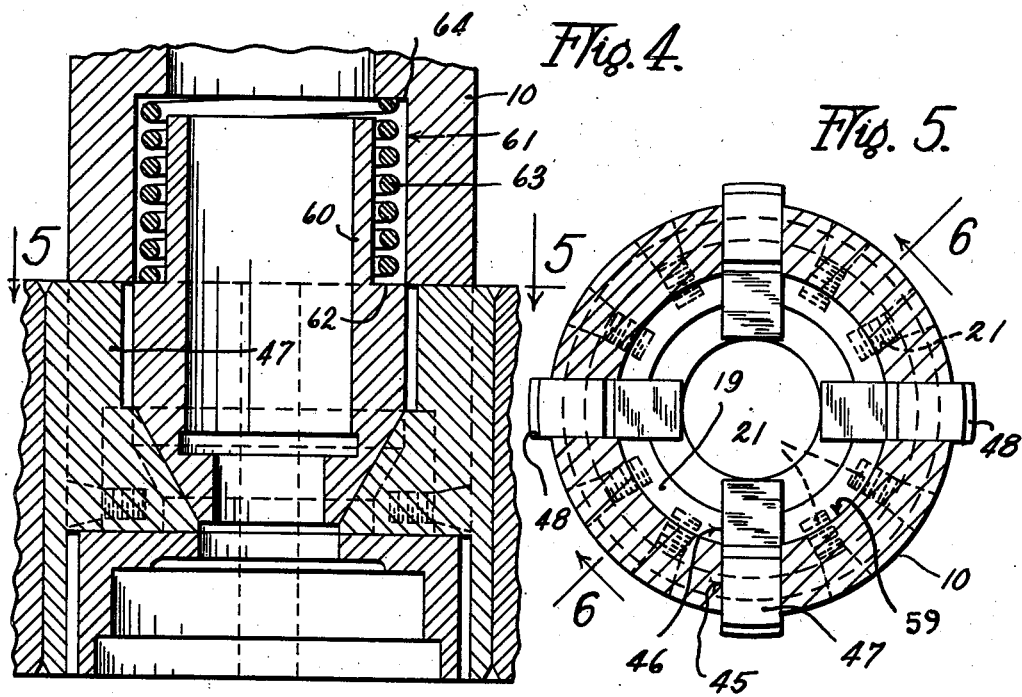
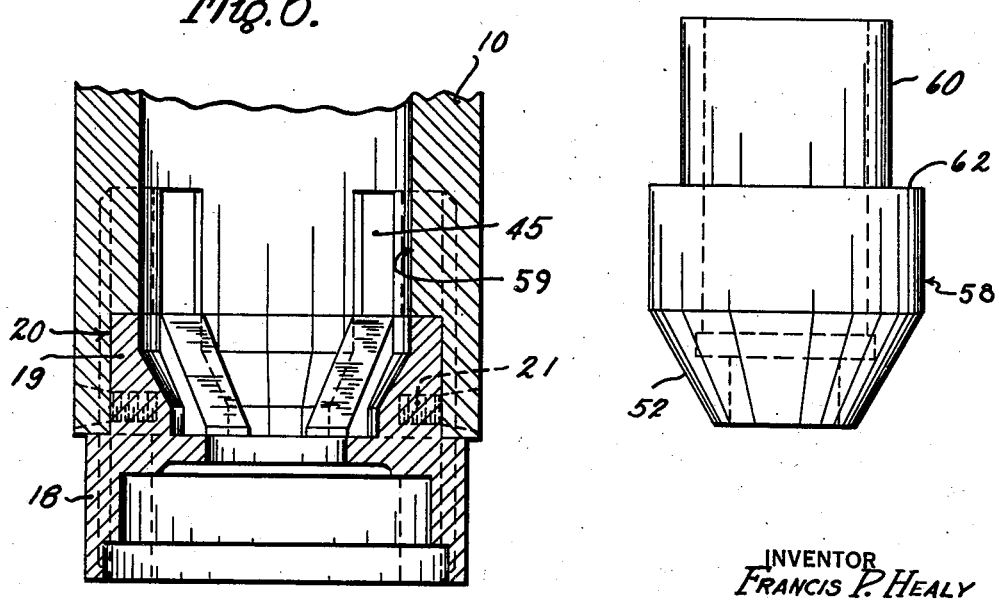

Patented Apr. 9, 1940

2,196,827

UNITED STATES PATENT OFFICE 2,196,827

TOOL GUIDE FOR BORING MACHINES

Francis P. Healy, Springfield, Mass., assignor to Van Norman Machine Tool Company, Springfield, Mass., a corporation of Massachusetts Application November 5, 1937, Serial No. 172,880

5 Claims. (Cl. 77—4)

This invention relates to boring machines, and has particular reference to improvements in follow guides which support the cutting tool by contact with the freshly cut bore and is a continuation in part of my copending application for Boring bar guiding mechanism, Serial No. 154,269, filed July 17, 1937. One object of the invention is to produce a cutter guiding mechanism which will require no automatic control for expanding it into contact with the bore wall and for contracting it to permit removal from the bore. Another object is to provide a very compact mechanism for maintaining the guiding members in unyielding contact with the bore under normal cutting conditions while permitting collapse of the guiding fingers in case they encounter abnormal strain. Another object is to provide a guiding mechanism in which the function of guiding the cutters is maintained by the same elements with no substantial interruption both before and after the guide elements enter the freshly cut bore.

Referring to the drawings,

Fig. 1 is a median section, partly broken away, of a boring bar embodying the invention;

Fig. 2 is a side elevation in diagrammatic form of a boring machine in which the boring bar may be mounted for operation;

Fig. 3 is a perspective detail of one of the guiding elements;

Fig. 4 is an enlarged median section of the lower end of the boring bar with the cutter head removed;

Fig. 5 is a transverse section on line 5—5 of Fig. 4 with the central expanding mechanism removed;

Fig. 6 is a section on line 6—6 of Fig. 5; and

Fig. 7 is a detail of the central expanding mechanism.

The boring spindle in which the invention has been embodied for illustration comprises a sleeve 10 secured in any desired way to a movable member 11 which may be vertically or horizontally reciprocable and may be the carrier member for all of the spindles of a multiple spindle boring machine. In the present case the sleeve is shown as provided with a shoulder 12 which bears against the lower side of the member 11 and with a collar 13 threaded on its exterior which bears against the upper side of the member. The detailed method of securing is not important, and the sleeve and the member 11 can for practical purposes be considered as unitary.

At its upper end the sleeve supports the outer race 14 of a roller bearing 15 of the conical type serving to carry both radial load and axial thrust. The inner race 16 of this bearing supports the upper end of a cutter shaft 17 revolving freely inside of the sleeve. At its lower end the sleeve 10 bears a cap 18 best shown in Fig. 6, having a shouldered portion 19 fitting within a recess 20 in the sleeve and fastened in place by screws 21. This cap serves as a guide for certain centering fingers to be described and is made separate from the sleeve for convenience in manufacture and assembly. The cap is chambered internally to receive other parts, and carries the outer race 22 of a roller bearing 23 which is also of the conical or radial thrust type. The inner race 24 of this bearing is carried by a cutter holder 25 fitted onto a taper 26 formed on the lower end of the shaft 17 and secured thereon as by threads 27. The lower side of the cutter holder is open for convenience in manufacture and is closed by a plate 28 forming one wall of a radial slot 29 in which a cutter 30 may be inserted. This cutter is of the extensible type fully described in the Arp Patent 1,906,241, May 2, 1933, and when set to a predetermined overall length outside of the cutter head is inserted in the slot so that its inner end rests against a stop 31 which, while adjustable, normally remains in a fixed position. The operation and manner of setting of this cutter is fully set forth in the Arp patent and need not be further considered here. An oil packing 32 of any desired design is preferably located between the bearing 23 and the cutter head to prevent leakage of oil.

Above and resting against the inner race 16 of the upper shaft bearing 15 is a pinion 35 keyed to the shaft at 36 and conveniently serving as a connection to any desired source of power by which the shaft may be rotated. It will be understood that the shaft is rotated in timed relation to the reciprocatory movement of the member 11 so that the cutter describes a helical path through the cylinder to be bored. A washer 37 rests on the pinion, and a heavy spring 38 is compressed between this washer and a collar 39 threaded onto the shaft at 40 and held in adjusted position by a set screw 41. This compression spring acts to draw the shaft 17 upwardly with respect to the sleeve 10 to the extent permitted by the bearings 15 and 23, preloading these bearings sufficiently to prevent any lateral movement of the shaft with respect to the sleeve.

In aligned slots 45 and 46 (Fig. 5), formed in the sleeve 10 and the shouldered part 19 of the cap 18 respectively, slide a plurality of guide fingers or cat's-paws 47. In the case shown there are four sets of slots and four guide fingers spaced equally around the periphery of the sleeve. Each finger is preferably beveled on its upper and lower outside edge as at 48 for a purpose to be described. The inner ends of the guide fingers are likewise beveled at 50 for contact with a cone 52. The particular relationship of the cone to the fingers will be considered at length below.

The cone member 52 is provided with a cylindrical portion 58 in sliding contact with the surface 59 of sleeve 10 and with a reduced portion 60 extending into a recess 61 formed in the sleeve and joined to the main part of the cone member by a shoulder 62. A compression spring 63 is located between the shoulder 62 and a shoulder 64 on the sleeve 10 to give the cone a constant pressure downwardly, or in a direction to expand the guides 47. This expanding tendency is resisted by the walls of the cylinder being bored while cutting is proceeding, and when the boring head is removed from the work is resisted by a guide member 65 which may be secured to the work piece or which may be carried by a bracket 66 secured to the upright frame 67 of the boring machine.

In prior devices the guide fingers have been made wholly non-yielding, or have been made non-yielding inwardly but provided with a spring take-up to permit them to move outwardly as dust and chips cleared from between the guide fingers and the bore wall. Neither of these methods of mounting is entirely suited for automatic operation. Non-yielding guide fingers, if not provided with a spring take-up, may be set to their fixed diameter with some of the fingers held out of contact with the bore wall by dust or chips, and the series of fingers thus left loose in the bore. Non-yielding fingers, whether or not provided with a spring take-up, are subject to injury if, for example, the cutting point of the tool 30 should break off during the boring operation, causing the guide fingers to meet a suddenly constricted portion of the bore. While wholly yielding fingers would meet the latter condition, they would also permit the reaction of the cutter to shift the axis of the boring bar, notably where the cut being taken is not concentric with the previously bored hole.

The guide finger mounting of the present invention avoids all of the difficulties of these prior devices by causing the fingers to be rigid until a predetermined load is applied and to be yielding thereafter. By suitable design the predetermined load can be taken at a point such that the reaction of the cutting tool will cause no motion of the axis of the boring bar, whereas if a constriction in the bore is encountered the fingers will contract or collapse. This novel result is accomplished by having the spring 63 act upon the fingers through the intervention of the cone 52, and permitting the spring to be free at all times to permit the fingers to move outwardly or inwardly as may be required to keep them in contact with the bore wall. If the angle of the cone were steep enough so that the angle of contact between it and the wedge-shaped ends of the guide fingers were less than the angle of repose, the wedge would become self-locking, and no inward pressure on the fingers would cause them to move, no matter how heavy this pressure might be. In accordance with the present invention the apex angle of the cone is sufficient so that the contact angle is greater than the angle of repose, and if the contact surfaces were completely frictionless the fingers would act as if spring-supported. Since these surfaces are not frictionless the pressure of the spring and the friction on the wedge surfaces combine to cause the fingers to act as if locked at low inward pressures on the fingers, and to be released for full spring support only when a predetermined inward pressure is reached. The condition of equilibrium is determined by the standard equation for the wedge in which friction is taken into account, considering for simplicity two fingers only.

$$P = \frac{2W \cos \phi \sin (\alpha - \phi)}{\cos (\alpha - 2\phi)}$$

where

P is the pressure of the spring just necessary to keep the fingers from moving inwardly
W is the pressure inwardly on each finger
$\phi$ is the angle of friction
$\tan \phi = \mu$ where $\mu$ is the coefficient of friction
$2\alpha$ is the apex angle of the cone.

This formula will be found, together with a discussion, on page 140 of "Analytical Mechanics for Engineers," by Seely and Ensign, New York, 1927. Using this formula and assuming an apex angle of 60° and a coefficient of friction of 0.25, this shows that a spring pressure of about 27 pounds will hold the fingers fixed against any movement until a pressure of 50 pounds on each of two opposite fingers is reached, which has been checked closely by experiment.

The limiting condition can be varied by changing either the apex angle of the cone or the strength of the spring. Decreasing the apex angle without changing the spring increases the pressure necessary to be exerted on opposite fingers to cause them to move inwardly, or in other words increases the range within which the fingers are rigid. It also increases the effect of a spring of given strength after the fingers begin to move, but not in the same proportion. It is possible with a rather low apex angle to use a long spring without sacrificing the rigidity of the fingers under low loads and thus decreasing the stiffness of the assembly at loads sufficient to cause movement of the fingers.

Even though the angle of the cone be taken so blunt as to lower the locking range below the reaction pressure of the cutter, a much more stable system will result by having one spring act on all guide fingers than by having individual springs acting on each member. Assuming a frictionless cone to illustrate the point, an inward pressure on one finger due to lateral shifting of the shaft will be resisted by the full force of the single spring, since by a lateral movement of the axis the pressure on the fingers away from which the movement takes place is removed. Were separate springs to be provided for each finger, the resistance to lateral movement of the cutter shaft would be only the difference in the compressive forces on the opposing springs due to the amount of deflection. For small deflections this would be very slight and the cutter head would be correspondingly unstable.

The use of the guide member 65 makes it possible to simplify the mechanism greatly in cases where the boring head is being used to duplicate the boring operation on a large number of work pieces, as in the making of automobile cylinders. Since in operations of this class the guides 47 always act at a definite diameter the guide member 65 can be chosen to hold the guides at substantially that diameter. If the cutter member travels upwardly far enough to be received within the guide member this is preferably made slightly larger than this constant diameter of bore, to avoid scratching the guide member by the tool. Otherwise the guide member may be slightly larger or smaller than the bore diameter or, preferaby, of the same size, the beveled ends 48 of the guides serving to pass the guides from the bore to the guide member smoothly and without disturbing the centering action of the guides. The guides 47 are preferably of considerable length so that they have at all times a substantial portion of their guiding surfaces in contact either with the guide member 65 or with the work piece.

I claim:

1. A boring machine having a cutter rotatable and reciprocable relative to the work to be bored, a plurality of guide members mounted in guiding relation to the cutter and having guiding surfaces in position to contact the freshly cut bore to the rear of the cutter, and a guide located adjacent to the bore to be cut in position to be engaged by the guiding surfaces of the guide members prior to the start of the boring operation, said guide members having inclined inner surfaces, a cone free of the rotation of the cutter contacting the inclined inner surfaces of the members, and yielding means for forcing the cone axially to expand the members, the contacting surfaces of the cone and members being at such an angle relative to the axis of the cone that the members will always have a tendency to expand during the boring operation, will be locked against inward motion under the normal thrust exerted upon the guide members by the reaction of the cutting operation, but will be reversible to permit inward movement of the members against the force of the yielding means under conditions of overload, whereby the guiding surfaces of the guide members will be held in firm guiding contact with the guide and then with the freshly cut bore as they pass from one to the other irrespective of slight variations in diameter between the guide and the bore, said guide members being constructed to contact either the guide or bore at all times during the boring operation.

2. A boring machine having a cutter rotatable and reciprocable relative to the work to be bored, a plurality of guide members reciprocable but non-rotatable with respect to the work, said guide members being mounted in guiding relation to the cutter and having guiding surfaces in position to contact the freshly cut bore to the rear of the cutter, said members having inclined inner surfaces, a cone free of the rotation of the cutter contacting the inclined inner surfaces of the members, and yielding means for forcing the cone axially in a direction to expand the members, the contacting surfaces of the cone and members being at such an angle relative to the axis of the cone that the members will always have a tendency to expand during the boring operation, will be locked against inward motion under the normal thrust exerted upon the guide members by the reaction of the cutting operation, but will be reversible to permit inward movement of the members against the force of the yielding means under conditions of overload, and a guide located adjacent to the bore to be cut in position to be engaged by the guiding surfaces of the guide members prior to the start of the boring operation whereby the guiding surfaces of the guide members will be held in sliding contact with the guide and then with the freshly cut bore as they pass from one to the other irrespective of slight variations in diameter between the guide and the bore, said guide members being constructed to contact either the guide or bore at all times during the boring operation.

3. A boring machine comprising a reciprocable, non-rotatable sleeve, a boring bar rotatably mounted in the sleeve for reciprocation therewith, a cutter mounted on the bar, a plurality of guide members mounted in radial ways in the sleeve, a non-rotating annular member slidable within the sleeve and free of the cutter and having an outer conical surface contacting the inner surfaces of the guide members, a spring confined between the sleeve and the annular member to force the cone axially in a direction to expand the guide members, the cone having an angularity such as to permit the guide members to yield inwardly by moving the cone to compress the spring, and a guide secured in adjacency to and coaxial with the bore to be cut and positioned to receive the guide members prior to the start of the cutting operation, the guide members being beveled at their ends to facilitate their transfer between the guide and the bore and dimensioned to contact either the guide or bore at all times during the boring operation.

4. A boring device comprising a reciprocable member, a cutter head rotatably carried by the reciprocable member and reciprocable therewith, a plurality of radially movable guiding members coupled to said reciprocable member in a position wholly to the rear of the cutter for movement through the bore in a direction parallel to the axis of the cutter for axial sliding contact with the wall of the freshly cut bore, said guiding means collectively forming a follow guide for the cutter, a single wedge member having wedge contact with each of said guiding members to move them simultaneously and uniformly into radially extended position, keying means constraining the guiding members for substantially pure translational movement with respect to the axis of the cutter, yielding means acting to cause relative translational movement between said guiding members and said wedge means in a direction to cause simultaneous and uniform radially outward movement of the guiding members, a cutter shaft connected to the cutter head and extending axially through both said follow guide and said wedge member and rotatable relative thereto, bearing surfaces between the cutter head and said wedge member whereby the axis of the cutter head will be positioned by the contact of the guiding members with a surface surrounding them and with said wedge member, and a stationary guide mounted externally of and adjacent to the work piece to be bored, and in coaxial relation thereto, to maintain the axis of the cutter in coincidence with the axis of the work piece during the initial part of the boring operation.

5. A boring device comprising a reciprocable member, a cutter head rotatably carried by the reciprocable member and reciprocable therewith, a plurality of radially movable guiding members coupled to said reciprocable member in a position wholly to the rear of the cutter for movement through the bore in a direction parallel to the axis of the cutter for axial sliding contact with the wall of the freshly cut bore, said guiding means collectively forming a follow guide for the cutter, a single wedge member having wedge contact with each of said guiding members to move them simultaneously and uniformly into radially extended position, keying means constraining the guiding members for substantially pure translational movement with respect to the axis of the cutter, yielding means acting to cause relative translational movement between said guiding members and said wedge means in a direction to cause simultaneous and uniform radially outward movement of the guiding members, a cutter shaft connected to the cutter head and extending axially through both said follow guide and said wedge member and rotatable relative thereto, bearing surfaces between the cutter head and said wedge member whereby the axis of the cutter head will be positioned by the contact of the guiding members with a surface surrounding them and with said wedge member, and a stationary guide mounted externally of and adjacent to the work piece to be bored, and in coaxial relation thereto, to maintain the axis of the cutter in coincidence with the axis of the work piece during the initial part of the boring operation, said stationary guide being of substantially the same diameter as that of the bore to be cut and being closer to the end of the work piece than the length of the guiding members taken in a direction parallel to the axis of the cutter, the effective angle of the wedge contact between the wedge means and the guiding members being below that at which the wedge becomes self-locking for normal radial guiding stresses and above that at which the wedge becomes self-locking for the radial pressure exerted upon the guide members by entering a constricted part of the bore, the guiding members being beveled at their ends, whereby the guiding members may pass from an initial position within the stationary guide to a position within the freshly cut bore while retaining control of the position of the axis of the cutter head.

FRANCIS P. HEALY.